(No Model.)

A. POST.
BELT COUPLING.

No. 424,023. Patented Mar. 25, 1890.

Witnesses:
Ewell a Dick
Will. E. Aughinbaugh

Inventor:
Alexander Post
by Marcellus Bailey
his atty

UNITED STATES PATENT OFFICE.

ALEXANDER POST, OF EILPE, NEAR HAGEN, PRUSSIA, GERMANY.

BELT-COUPLING.

SPECIFICATION forming part of Letters Patent No. 424,023, dated March 25, 1890.

Application filed January 28, 1889. Serial No. 297,820. (No model.)

*To all whom it may concern:*

Be it known that I, ALEXANDER POST, a subject of the King of Prussia, residing at Eilpe, near Hagen, Kingdom of Prussia, Germany, have invented new and useful Improvements in Belt-Couplings, whereof the following is a specification.

My invention relates to belt-couplings principally designed to be used with belts that are made of woven fabrics; and it consists in the construction of a coupling whereby the ends of the belts can be securely connected together without damage to the same, which adapts itself to pulleys of small diameter, and which operates with like friction on the surfaces of the pulleys as the belt itself.

The said coupling comprises two leaves hinged together and two separate counter-plates, the former bearing from the outside, the latter from the inside on the belt ends, and the corresponding parts being fastened together by screws passing through the belt. In order to produce a firm grip of the leaves on the belt the bearing-surfaces of the same are roughened or provided with small corrugations, and the counter-plates may have like bearing-surfaces. On one side the said counter-plates are lined with leather or other material adapted to produce the necessary friction on the pulleys. Preferably, the leaves, as well as the counter-plates, are curved, so as to form segments of cylinders. If desired, each coupling part may be composed of two or more leaves hinged together and of the corresponding counter-plates.

Figure 1:
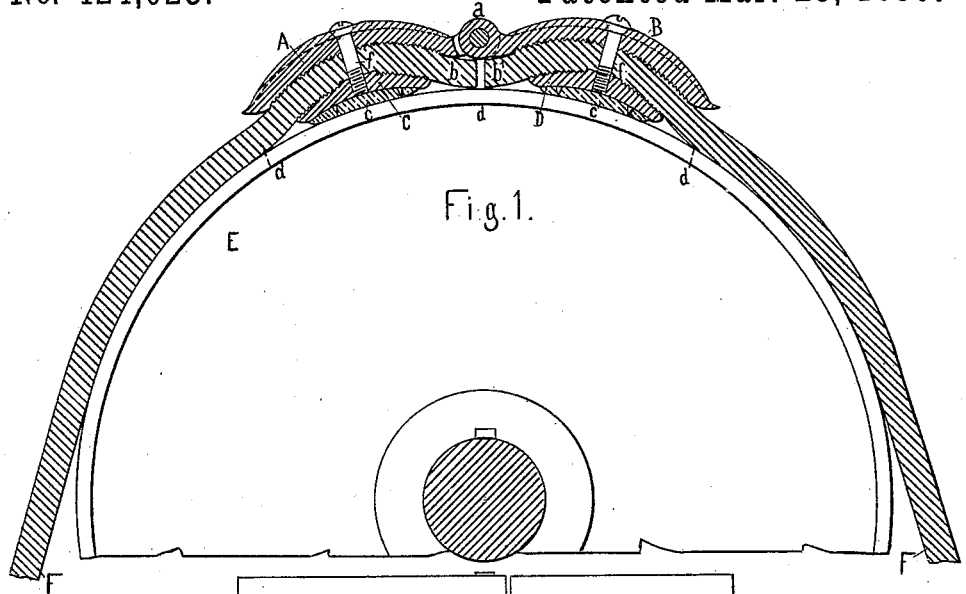
Figure 2:
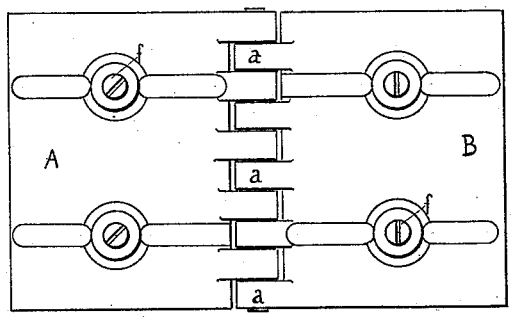
Figure 3:
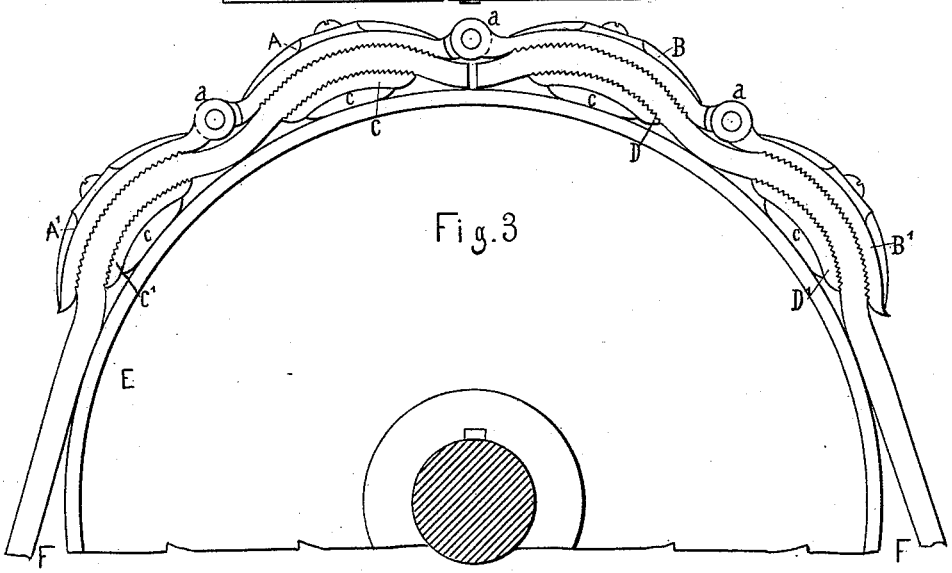

In the annexed drawings, Figure 1 is a transverse section, and Fig. 2 a plan, of a coupling carried out according to my invention. Fig. 3 represents a coupling with double leaves.

In Fig. 1, F is a belt on the pulley E.

A B, Figs. 1 and 2, are the leaves of the coupling, hinged together at $a$, and C D the counter-plates. The said leaves and the corresponding plates are fastened together on the ends $b\ b'$ of the belt by the screws $f$, and for increasing their grip on the belt their bearing-surfaces are provided with small angular corrugations.

$c\ c$ are linings of leather fixed to the plates C D by means of pins or spurs formed upon the latter. Both the leaves and the counter-plates are curved in the manner shown by the drawings, a suitable cavity being thus produced in the plates C D for receiving the lining $c$, while at the same time this curvature causes the portions $d$ of the belt being close to the parts of the coupling to be pressed against the pulley.

In the coupling shown by Fig. 3 each part thereof consists in two leaves A A' and B B' and in the respective counter-plates C C' and D D', the leaves of either part being hinged together in like manner as the leaves A and B. This coupling is designed to be used with belts serving for the transmission of very considerable forces.

I claim as my invention—

In a belt-coupling, the combination of two or more curved leaves hinged together and having roughened bearing-surfaces, two or more curved counter-plates, screws or bolts whereby the leaves and the counter-plates are fastened together on the belt and linings of leather or other equivalent material applied to the counter-plates, substantially as described.

In testimony whereof I have hereunto set my hand in the presence of two subscribing witnesses.

ALEXANDER POST.

Witnesses:
 W. GESENBERG,
 C. AUG. BICK.